L. S. PFOUTS.
VEHICLE TIRE.
APPLICATION FILED NOV. 20, 1911.

1,064,766.

Patented June 17, 1913.

Witnesses:

Inventor
Leroy S. Pfouts.

Attorneys

UNITED STATES PATENT OFFICE.

LEROY S. PFOUTS, OF CANTON, OHIO.

VEHICLE-TIRE.

1,064,766.　　　　Specification of Letters Patent.　　Patented June 17, 1913.

Application filed November 20, 1911. Serial No. 661,340.

*To all whom it may concern:*

Be it known that I, LEROY S. PFOUTS, a citizen of the United States, residing at Canton, in the county of Stark and State of Ohio, have invented a new and useful Vehicle-Tire, of which the following is a specification.

This invention relates to improvements in vehicle tires, and especially to a form of such tires combining both pneumatic and cushion elements.

The objects of the invention are to generally improve devices of the character mentioned, to provide for the ready insertion of the cushion element within the outer casing and for subsequently laterally expanding and annularly enlarging said cushion within said casing, to provide a tire embodying a pneumatic element so arranged as to be free from the compression of much of the load and practically secure from puncture or other injury, to prevent blow-outs, increase resiliency and permit the use of the cushion only, in case of possible injury and consequent deflation of the pneumatic element. These objects, together with other objects apparent to those skilled in the art, may be attained by the construction illustrated in the accompanying drawing, although the invention may be embodied in other forms, the construction illustrated being chosen by way of example.

Figures 1, 2:
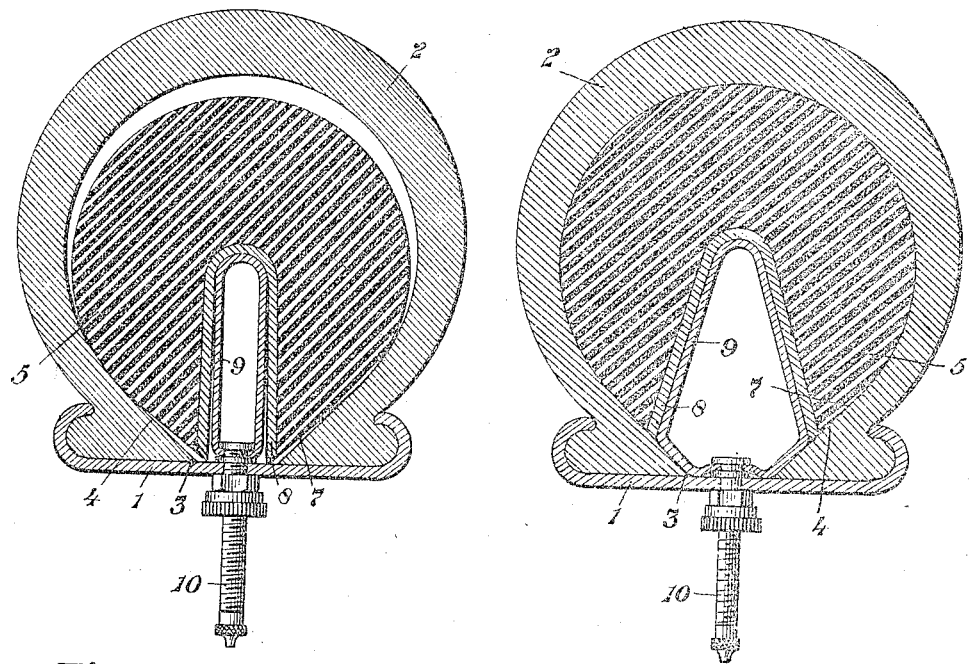
Figure 3:
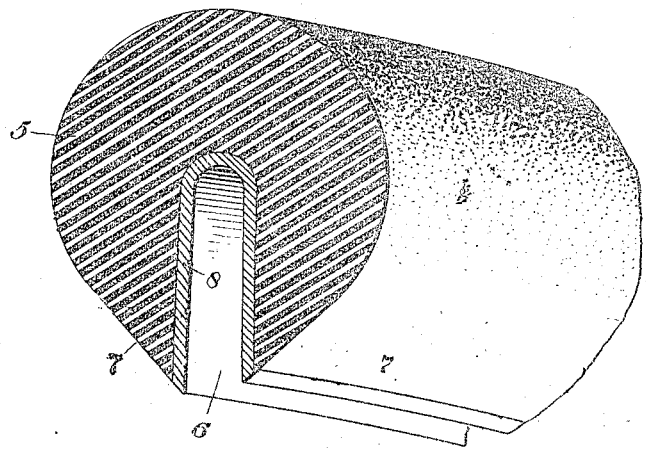

In the drawing Figure 1 is a transverse sectional view through a tire embodying my invention mounted on a clencher rim, the pneumatic element being deflated. Fig. 2 is a similar view showing the pneumatic element inflated. Fig. 3 is a fragmentary perspective, partly in transverse section, of the cushion member.

Throughout the several views, similar reference numerals indicate similar parts.

Essentially, my invention comprises an outer casing, a cushion element normally smaller than the inner cavity of said outer casing within said outer casing and a pneumatic element also within said outer casing and adapted, upon being inflated, to laterally and annularly expand said cushion element and press the same outwardly against the inner wall of the outer casing.

With this general statement in mind and more specifically describing the construction disclosed in the drawing, the numeral 1 indicates a clencher rim of well known construction and 2 an outer casing detachably mounted on said rim. There are many satisfactory constructions of rims and outer casings now in use, and it will be understood that my invention necessitates no particular construction in these parts but may be readily attached to any usual construction.

The inner marginal edges 3 of the casing preferably lie well to the center line of the rim and the substantially tangential portions 4 of the inner surfaces of the casing adjacent said edges 3 preferably extend from said edges in oppositely inclined positions to meet the cylindric inner walls of the main portion of said casing. This is not an uncommon construction in outer casings, and is especially desirable in a tire embodying my invention, as will be presently more fully understood.

The cushion 5 is preferably made in one continuously annular piece of a compressible, elastic or resilient material such as sponge rubber, and in cross section is shaped similar to but smaller in cross section than the inner cavity of the casing 2. Said cushion is, of course, of less annular measurement at its point of greatest circumference than the annular measurement of the cavity of said casing at its point of greatest circumference, but is of sufficient annular dimension to extend around the wheel. In said cushion is arranged the inwardly open, relatively deep and narrow annular slot 6 adapted to receive the pneumatic element. It will be noted that the side walls of said slot are parallel and lie in planes perpendicular to the axis of the wheel when the tire is in deflated condition and that the area of said side walls is much greater than the area of the inner or bottom wall of the slot. Adjacent the slot 6 the outer, substantially tangential surfaces 7 corresponding to the substantially tangential portions 4 are provided. If desired the slot 6 may be lined with smooth-surfaced material 8 to give a suitable contact surface for the pneumatic element, which consists of an inner inflatable tube 9, preferably of rubber, and provided with the customary air valve 10.

In arranging a tire of my invented construction upon a wheel, the casing may be readily attached to the rim while the tube 9 is deflated, when in such condition the cushion does not entirely fill the cavity in the outer casing, said cushion being smaller both in cross section and annular measurement than the inner cavity of the casing, and the various parts are therefore free to be arranged and adjusted without the use of special tools or appliances and without the application of any considerable force. When such arrangement has been accomplished and the casing is in proper position on the rim the tube 9 assumes substantially the shape of the slot 6 and may be inflated. While being inflated said tube first completely fills the slot 6. The side walls of the slot being of relatively great area, the pressure exerted by the expanding tube is mostly sidewise in the direction to expand the cushion in cross section by an angular movement of the side walls of the slot 6 with reference to each other and the consequent relative outward movement of the adjacent portions of the cushion. While such lateral expansion is taking place there is also outward pressure exerted upon the bottom or inner wall of the slot 6 and by the forcible lateral angular movement of the walls of the slot and less forcible outward pressure upon the bottom wall the cushion is expanded in cross section and enlarged annularly and the surfaces 7 caused to slide up the inclined portions 4, thus filling the cavity of the casing completely and producing a uniformly resilient structure. As said surfaces move up said portions, the slot 6 assumes a V-shape in cross section, portions of the tube 8 coming into contact with the portions 4 of the casing where the edges of the slot 6 have moved away from the edges 3.

It should be noted that the slot 6 is of a depth substantially equal to one-half the diameter of the cushion and although the tube 8 be inflated with air under heavy pressure the body of the cushion will resist compression sufficiently to maintain the tube 8 at such distance from the exterior of the casing as to make it practically safe from ordinary external injury, such as puncture. At the same time the tube 8 is so thoroughly and strongly incased by the cushion and edges of the casing as to make blow-outs almost impossible and the intermediate cushion 5, receiving the violent shocks and concussions of travel from the casing 2, will transmit the same to the inner tube in a distributed and less harsh manner. Attention is further called to the fact that when under load the weight thereof will not be borne only or even principally by the pneumatic element, as the cushion presents within itself a bridge construction carrying the weight of the load around and over the pneumatic element through the cushion to the rim, the pneumatic element serving principally to strengthen and compress the cushion element and render it capable of proper resilient action under the load. The casing 2 being backed by the cushion 5 with a firm yet yielding pressure improves the working conditions of the same and relieves it of considerable tractional and side-thrust strain.

If by reason of serious accident the inner tube becomes deflated the cushion will in a large measure protect both the outer casing and the inner tube from injury if the vehicle is further run with the tire in deflated condition.

I claim—

In combination with the rim of a wheel, a tire of the character described, comprising a casing having a rim attaching portion and an inner, annular cushion-receiving cavity, an annular, elastic cushion in said cavity, said cushion provided with an inwardly open, relative deep and narrow annular slot having substantially parallel side walls and an inner wall connecting said side walls substantially in the center of the cushion body, each of said side walls being of greater area than said inner wall, and an inflatable tube in said slot and adapted, when inflated, to bear against said rim, the walls of said casing and the side walls and inner wall of said slot and to expand said cushion by an angular outward movement of said side walls with reference to each other and a simultaneous sliding movement of said cushion over the inner surface of said casing away from said rim.

In testimony that I claim the above, I have hereunto subscribed my name in the presence of two witnesses.

LEROY S. PFOUTS.

Witnesses:
WILLIAM H. MILLER.
JOHN H. BISHOP.